Dec. 15, 1931. J. R. RICKETTS 1,836,041
VALVE STEM STRAIGHTENING FIXTURE
Filed May 31, 1930
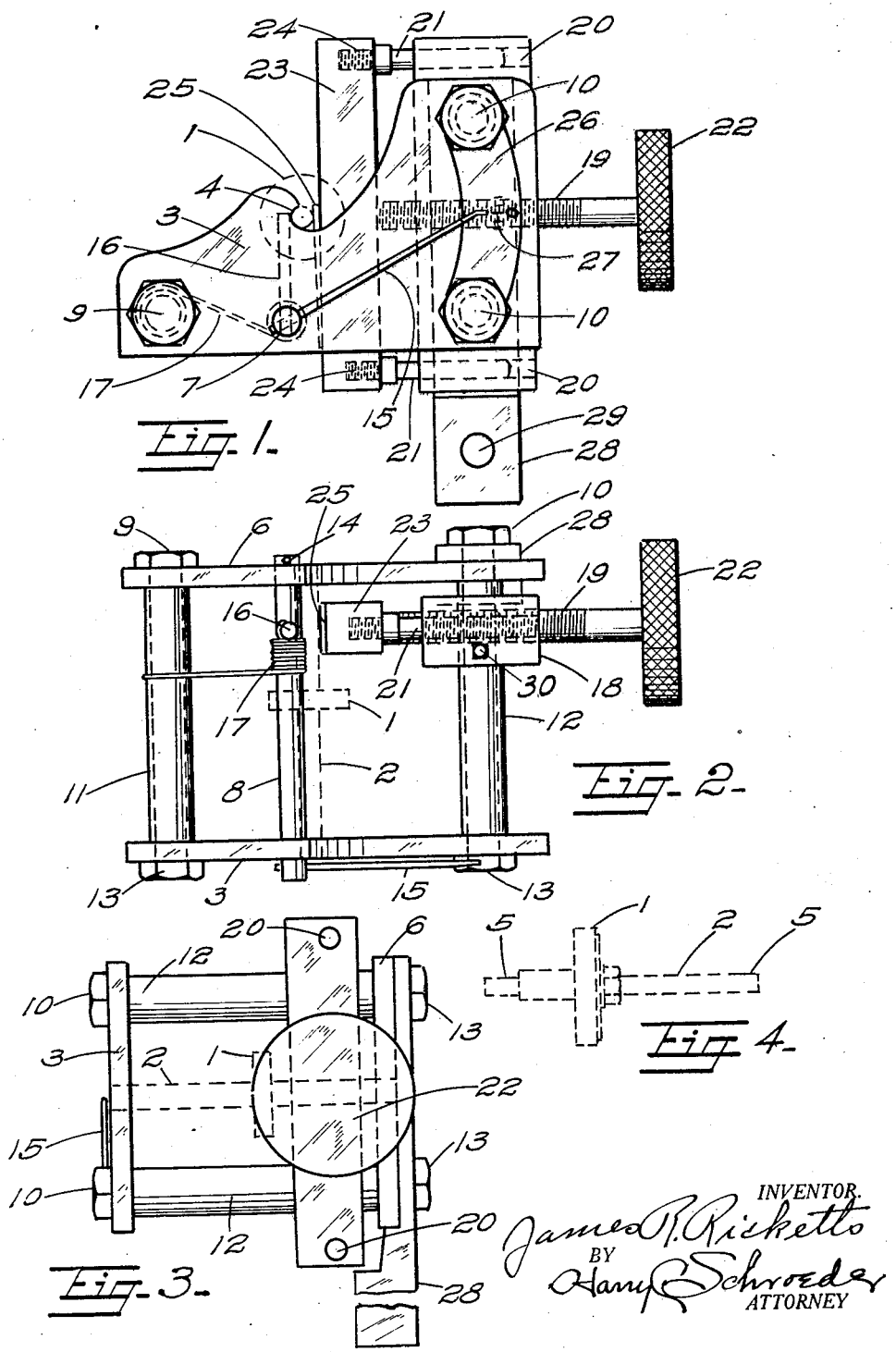

Patented Dec. 15, 1931

1,836,041

UNITED STATES PATENT OFFICE

JAMES R. RICKETTS, OF RICHMOND, CALIFORNIA

VALVE STEM STRAIGHTENING FIXTURE

Application filed May 31, 1930. Serial No. 458,341.

The invention is for an emergency straightening fixture and has particular reference to the straightening of emergency valve stems of Westinghouse air brake valves.

The main object of the invention is to provide a manually operated device for testing and straightening emergency valve stems and indicating any eccentricity existing in said valve stem.

Another object of the invention is to provide a manually operated device in which any eccentricity in valve stems may readily be detected, and corrected, quickly and conveniently, by means of a straightening device, adapted for operation at an effective point on said valve stem.

With these and other objects in view, which will be apparent as the description is set forth, and in the appended claims, the drawings are made to illustrate the invention in what is believed to be its most desirable form; however, it will be noted that changes in the form or construction may be made without detracting from the spirit or scope of the invention, or sacrificing any of the advantages thereof, as set forth in the appended claims.

In the accompanying drawings, similar characters of reference are used to indicate similar parts throughout the several views, in which:

Fig. 1 is a side elevation of the device;

Fig. 2 is a top plan view indicating an emergency valve in dotted lines in position for testing and straightening;

Fig. 3 is an end elevation of the device;

Fig. 4 indicates, in dotted lines, one type of emergency valve to which the device is particularly adapted for testing and straightening operations.

Reference numeral 1 indicates a valve of the type to which the invention is particularly adapted and mounted in position for testing and straightening of the shaft 2. A pair of oppositely disposed side plates 3 and 6 are provided with an arcuate recess 4, adapted to receive the ends 5 of shaft 2. Apertures 7 in plates 3 and 6 provide bearings for index shaft 8. Apertures are also provided to receive bolts 9 and 10. Plates 3 and 6 are retained in parallelism and in spaced relation by means of cylindrical spacers 11 and 12, bolts 9 and 10 being admitted through a centrally disposed aperture in said spacers, suitable nuts 13 being provided for bolts 9 and 10 for the purpose of rigidly connecting the structure. Index shaft 8 projects through apertures 7 and is closely fitted therein, and is provided with a retaining pin or cotter 14 at one end adjacent plate 6, the index pointer 15 providing retaining means at the opposite end adjacent plate 3. A feeler 16, integral, or pressed into shaft 8, also provides anchorage for torsion spring 17 which is fitted about shaft 8 and has its reactive anchorage on spacer 11, as indicated. A head 18 is mounted on spacers 12, said spacers being equally disposed on opposite sides of and relative to a center line through arcuate recess 4. Centrally disposed between the spacer apertures in head 18 a through tapped hole is provided to cooperate with the jack screw 19 oppositely disposed and in spaced relation to said spacer apertures. Pilot apertures 20 are provided to cooperate with pilots 21. Jack screw 19 is provided with a knurled head 22 of a proper size for convenient manipulation of said jack screw. The anvil 23 is provided with tapped holes 24 cooperating with the threaded portion of pilots 21, said tapped holes 21 being so disposed as to register with pilot apertures 20 in head 18. A facing 25 is provided to prevent scoring or marring of valve stem 2, and may be provided in the form of resilient material or a soft metal, such as copper. A set screw 30 is provided for retaining head 18 in relative position to feeler 16.

Index plate 26 is provided with an index mark 27 to cooperate with index pointer 15. A suitable bracket 28 is provided having the mounting hole 29 for conveniently mounting said fixture, said bracket being attached to said fixture by means of bolts 10.

The operation of the invention is as follows: A valve of the type indicated in Fig. 4 is placed with ends 5 in arcuate recesses 4 in side plates 3 and 6, with feeler 16 disposed against the rear of shaft 2. Anvil 23 is advanced by means of jack screw 19 to such position as to retain shaft 5 in arcuate recesses 4. Valve 1 is then revolved, and any eccentricity or error existing in the valve stem 2 will be indicated by means of feeler 16, co-operating with spring 17, movement of said feeler 16 being transmitted, by means of index shaft 8 to index pointer 15, the deviation of pointer 15, from index mark 27 indicating the amount of error in said valve stem. The valve is turned so as to present the convex surface relative to the axis of said stem, in contact with said anvil, jack screw 19 being advanced, thus springing shaft 2 and thereby straightening said shaft. Head 18 is mounted on spacers 12 in such position as to be oppositely disposed relative to valve stem 2.

I claim:

1. In combination, a pair of side plates in spaced relation, said side plates being provided with arcuate recesses, in matched relation, said recesses being adapted to fit the ends of an emergency valve stem, an indicator cooperating with said valve stem, a pressure member in opposition to said arcuate recesses, said pressure member being adjustable transversely relative to said valve stem, and axially retained on the supports for said pressure member, and oppositely disposed relative to said indicator actuating means.

2. In combination, a pair of side plates in spaced relation and parallel one to the other, spacing and retaining means between said side plates, an arcuate recess in each of said side plates, in matched relation, and adapted to retain the stem of an emergency valve, a feeler for cooperating with, and adapted to be resiliently retained against said valve stem, said feeler cooperating with an index pointer to indicate deviation from true axial alignment of said valve stem, and manually operated means for straightening said valve stem, and disposed oppositely relative to said feeler.

3. In combination, a pair of side plates in spaced relation and parallel one to the other, spacing and retaining means between said plates, a recess in each of said plates in matched relation and adapted to receive an emergency valve stem, an indicating device comprising a feeler for acting on the periphery of said valve stem, said feeler being pivotally mounted between said side plates, resilient means adapted for retaining said feeler in contact with said valve stem, and an indicating pointer attached to said feeler pivot, valve stem straightening means comprising an anvil, a pair of pilots or guides integral with or attached to said anvil, a head oppositely mounted relative to said feeler on said spacing means, apertures in said head cooperating with said pilots or guides, a screw centrally disposed in said head between said pilots or guides, one end of said screw abutting centrally of said anvil, and a head for said screw adapting same for manual operation, and means for attaching said combination to a support.

4. An emergency valve stem straightening fixture, comprising, in combination, a housing, means for supporting said valve stem in said housing, and retaining same against the action of straightening means, an indicator, comprising a feeler adapted to be resiliently held against the periphery of a valve stem, said feeler being integral with or fixed to a shaft, and in angular relation thereto, an indicating pointer attached to said shaft, outside of, and adjacent to said housing, an indicating mark on said housing whereby the coincidence of said pointer with said indicating mark signifies true axial alignment of said valve stem, a straightening device adapted to operate in opposition to said valve stem support, said straightening device comprising a guided member, a thrust member cooperating with said guided member, said thrust member being mounted in parallelism with said valve stem retaining means, a threaded member cooperating with said thrust member, said threaded member abutting said guided member and adapted to provide sufficient pressure to straighten said valve stem.

In testimony whereof I affix my signature.

JAMES R. RICKETTS.